United States Patent [19]

Kincaid et al.

[11] Patent Number: 4,858,470
[45] Date of Patent: Aug. 22, 1989

[54] VIBRATION TRANSDUCER MOUNTING

[75] Inventors: Harry R. Kincaid, Johnstown; Walter S. Riggs, Heath, both of Ohio

[73] Assignee: IRD Mechanalysis, Inc., Columbus, Ohio

[21] Appl. No.: 172,139

[22] Filed: Mar. 23, 1988

[51] Int. Cl.⁴ ............................................ G01H 11/08
[52] U.S. Cl. ......................................... 73/654; 73/493
[58] Field of Search ................. 73/654, 652, 649, 493, 73/431; 310/329

[56] References Cited

U.S. PATENT DOCUMENTS

| | | | |
|---|---|---|---|
| 3,104,335 | 9/1963 | Shoor | 73/654 |
| 4,326,143 | 4/1982 | Guth et al. | 310/329 |
| 4,555,944 | 12/1985 | Hanson | 73/431 |
| 4,771,637 | 9/1988 | Kubler | 73/493 |

Primary Examiner—John Chapman
Attorney, Agent, or Firm—Mueller and Smith, LPA

[57] ABSTRACT

A mounting arrangement for vibration transducers such as accelerometer sensors particularly suited for adverse environments as may be encountered with machine tool components and the like. A mounting base is permanently fixed to a vibratory surface to be monitored. This cylindrical base incorporates an annular retaining groove formed in its side surface which cooperates with an annular resilient band which is discontinuous to provide ends which, in turn, may be drawn together when the band is constricted by an external clamp. The band includes a stud ring which engages the groove of the mounting base and then permits facile engagement of a transducer base having a V-shaped groove configured at the lowermost portion thereof. The retainer ring or band also incorporates a detent ring which engages the groove of the transducer base. A hose clamp or the like then is used to constrict the resilient annular band to drive the transducer into a compressive relationship with the top surface of the mounting base. A cable clamp may be employed which serves to retain armor cladding over communications cable emanating from the transducer and is removably retained in position by the hose clamp.

18 Claims, 2 Drawing Sheets

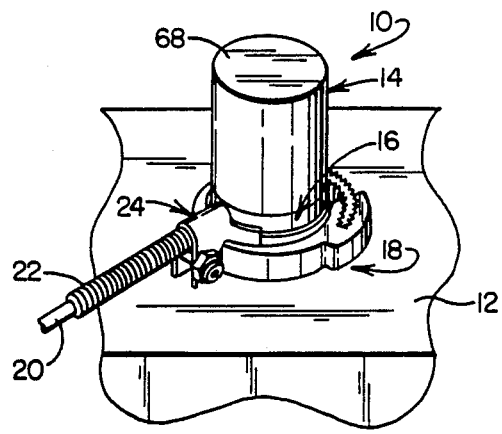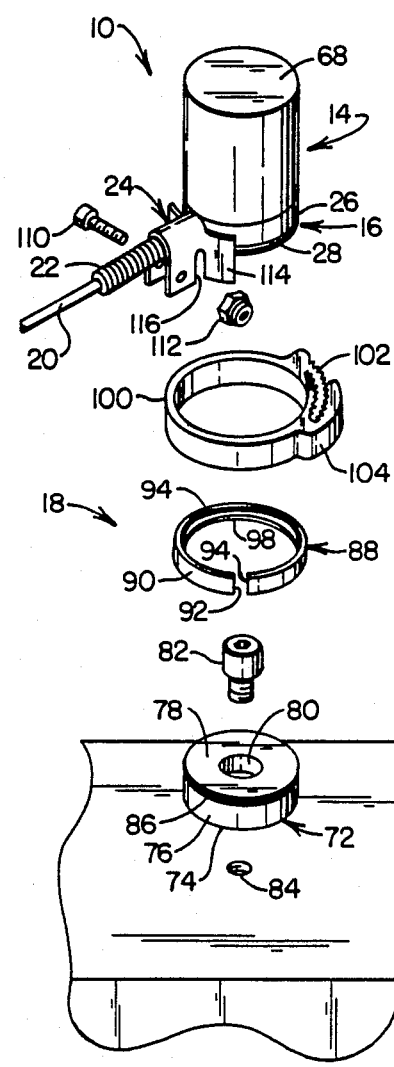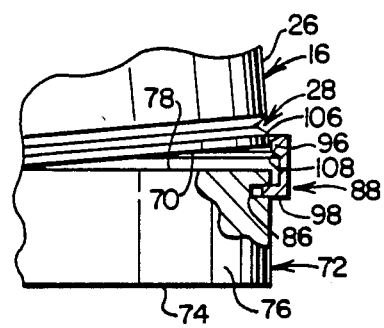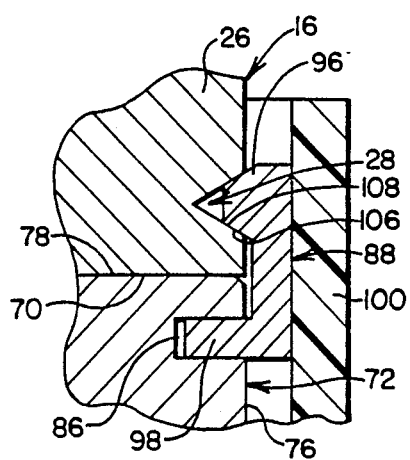

VIBRATION TRANSDUCER MOUNTING

BACKGROUND OF THE INVENTION

Industry has long relied upon a concept for preventive maintenance which is based upon the detection, analysis, and correction of vibration in monitored machinery. Initially, periodic vibration measurements were made with hand-held devices at various locations upon such machinery, whereupon changes in vibration characteristics were noted as representing a possible condition of machine deterioration. More elaborate vibrational analyses, for example involving vibration frequency spectrum approaches, then could be employed in diagnostic endeavors. As this general approach to preventive maintenance grew, many industrial entities implemented vibratory monitoring system in which a significant number of vibration transducers or pick-ups were permanently installed at various locations upon the machinery and their vibration related outputs monitored on a somewhat continuous basis with respect to predetermined warning and trip alarm levels. Such long term monitoring systems are described, for example, in U.S. Pat. Re. No. 31,750 and U.S. Pat. No. 4,399,513.

The pick-ups or transducers employed with the vibration responsive systems generally are structured to evaluate selected characteristics of vibration which typically are characterized as displacement, velocity and acceleration. Vibration velocity data long has been selected by industry as a direct measure of vibration severity. Displacement measurements have found considerable application, for example, in evaluating stress at low frequencies in machinery. Vibration acceleration measurements are employed to evaluate vibrating forces applied to machines under investigation. Accelerometer type transducers used for the latter data gathering function exhibit desirably flat response characteristics over extended frequency ranges and are somewhat conveniently, compactly structured. In general, the devices employ a known mass with a piezoelectric crystal to develop charge values reflecting characteristics of force and mass from which acceleration signals readily are develped. An important application for accelerometers resides in their specific employment for detecting the very high frequencies associated with impending bearing failure. Because of their advantageous sensitivity to high frequency vibrations, the technique for mounting accelerometers has been considered somewhat more critical than those approaches employed with other transducer forms. It is essential not only that mechanical decoupling with a vibratory surface be avoided, but also that the coupling itself not exhibit elasticity. For example, the use of elongated mounting bolts is avoided in view of their low spring constants and contribution to a low resonant frequency for the mounting. In a substantial number of mounting applications, a permanent arrangement is involved wherein thin cement layers are employed with an intermediate layer of insulative material lying between the accelerometer confronting face and the monitored vibratory surface.

Over the recent past, accelerometer sensors have been combined with permanet monitoring systems to achieve an automatic tool action monitoring function. With these systems, the accelerometer pick-ups are mounted at strategic positions on a machine tool and serve to respond to distinct and repeatable patterns of vibrational phenomena, changes to which provide early warning of tool wear or breakage. These early warnings so provided by the system enable operators to gain maximum tool life as well as part quality. However, for the systems to optimally perform, it usually is necessary to mount the accelerometer sensors on spindles or tool holders or the like which function to manipulate or drive tools. Such mounting requires a very high level of integrity to maintain required frequency response characteristics and this integrity must be maintained while the sensors are attached to moving machine component within a factory environment which is quite severe. For example, the environment includes cutting fluids, chips, dirt, oil, humidity, and elevated temperatures. Thus, the sensors can eventually fail due to coolant or other contaminants or mechanical damage. Additionally, because the spindle mechanisms and the like are removed and disassembled for maintenance on a relatively frequent basis, accommodation must be made for the accelerometer sensors during such procedures. Conventional mounting approaches lead to frustration and, often, loss of the sensing function in consequence of operator frustration due to the difficulties attendant with the removal and re-installation of sensors, connected signal carrying wiring, and the like. Thus, to maintain monitoring effectiveness over reasonable system lifespans, it is necessary that some form of mounting for the accelerometer sensors be achieved which is readily mounted and removed to facilitate machine maintenance operations while maintaining the frequency response performance integrity, a condition heretofore requiring rigid and permanent mounting practices.

SUMMARY

The present invention is directed to apparatus and method wherein a vibration transducer such as an accelerometer is provided which is removably mountable upon a vibratory surface situated within a highly dynamic industrial environment, while still maintaining a requisitely broad flat frequency response characteristic. This highly secure, yet removable transducer mounting technique ideally suits the assemblage to use in monitoring machine tool action calling for sensor positioning on frequently maintained machine tool spindle components and the like. While reliably maintaining requisite vibrational frequency response performance in this rigorous environment, the transducer assembly is quickly and simply mounted and demounted by maintenance personnel.

Another particular aspect of the invention provides a vibration transducer assembly for demountable attachment with a vibratory surface which incorporates a mounting base having a contact surface for intimate engagement with the vibratory surface, a base peripheral wall, a vibration transfer surface spaced from the contact surface, and a base biasing connector component integrally formed at the base peripheral wall. The assemblage further includes means for securing the mounting base contact surface into intimate engagement with the vibratory surface and a transducer base is provided having an engaging surface configured for intimate contact in vibration transfer relationship with the mounting base vibration transfer surface, a peripheral transducer wall extends from the engaging surface and a transducer biasing connector component is integrally formed at the peripheral transducer wall. Transducer sensing components are supported by the transducer base and have a signal communication cable extending therefrom. A biasing ring is provided having an external surface and inwardly disposed first and second engaging components respectively engageable with the transducer biasing connector component and the base biasing connector component, and constrictable to effect movement of the transducer engaging surface into engagement against the mounting base vibration transfer surface. A constrictor arrangement is provided for effecting the constriction of the biasing ring.

Another particular aspect of the invention provides an accelerometer assembly for use in evaluating the vibrational characteristics of a predetermined surface. The assembly includes a mounting base having a contact surface for intimate engagement with the predetermined surface, an upstanding cylindrical side surface of given diameter, a vibration transfer surface spaced from the contact surface, and an annular retaining groove formed in the side surface. An arrangement for fixing the mounting base contact surface in vibration transfer relationship with the predetermined surface is provided and a transducer base is included having a lower disposed engaging surface configured for intimate abutting contact in vibration transfer relationship with the mounting base vibration transfer surface, a cylindrical periphery having the given diameter extending from the engaging surface and an annular groove having a connector surface canted outwardly and downwardly towards the engaging the surface. Accelerometer sensing components are provided which are supported by the transducer base and which have a signal communications cable extending therefrom for response to vibrational phenomena asserted at the vibration transfer surface and derivation of corresponding signals. A resilient, annular band is provided having oppositely disposed, mutually spaced ends, an integrally formed inwardly extending stud ring insertable within and engageable with the mounting base retainer groove and an integrally formed, inwardly extending detent ring having a biasing surface abuttable against the transducer base connector surface when the engaging surface thereof is positioned in adjacency with the mounting base vibration transfer surface. Finally, a constricting arrangement is provided for effecting a constriction of the resilient annular band to urge the oppositely disposed ends toward each other and, simultaneously, cause the band to urge the transducer based engaging surface into biased contact with the vibration transfer surface.

Still another particular aspect of the invention provides a method for removably attaching a vibration transducer to a vibratory surface which includes the steps of:

providing a mounting base having a contact surface, upstanding cylindrical side surfaces of given diameter, a vibration transfer surface spaced from the contact surface, and a retainer groove within the side surface;

fixing the contact surface to the vibratory surface in vibration transfer relationship;

providing a resilient annular band having oppositely disposed, mutually spaced ends, and integrally formed inwardly extending stud ring and an integrally formed inwardly extending detent ring having a downwardly disposed biasing surface;

mounting the annular band upon the mounting base by manipulating the stud ring over the side surface until the stud ring is engaged within the retainer groove to provide a mounting base and annular band assembly;

providing a transducer having a transducer base including a cylindrical periphery of the given diameter, a lower disposed engaging surface, and an annular groove adjacent the engaging surface having a connector surface canted outwardly and downwardly toward the engaging surface;

mounting the transducer loosely upon the mounting base and annular band assembly by manipulating the transducer base within the band until the detent ring engage the annular groove;

constricting the resilient annular band to cause the engagement of the biasing surface with the connector surface and thence to an extent deriving force vectors effecting a compressive abutting union between the engaging surface and the vibration transfer surface in an amount preventing the development of localized resonances.

Other objects and features of the invention will, in part, be obvious and will, in part, appear hereinafter.

The invention, accordingly, comprises the method and apparatus possessing the construction, combination of elements, arrangement of parts, and steps which are exemplified in the following detailed disclosure.

For a fuller understanding of the nature and objects of the invention, reference should be had to the following detailed description taken in connection with the accompanying drawings.

BRIEF DESCRIPTION OF THE DRAWINGS

FIG. 1 is a perspective view of a transducer assemblage according to the invention shown mounted on a vibratory surface;

FIG. 2 is an exploded view of the assemblage of FIG. 1;

FIG. 4 is a partial sectional view of the assemblage of FIGS. 1 and 2 showing component interaction during demounting procedures; and FIG. 5 is a partial sectional view of the transducer of FIGS. 1 and 2 showing the mounting securement technique of the invention.

DETAILED DESCRIPTION OF THE INVENTION

Figure 3:
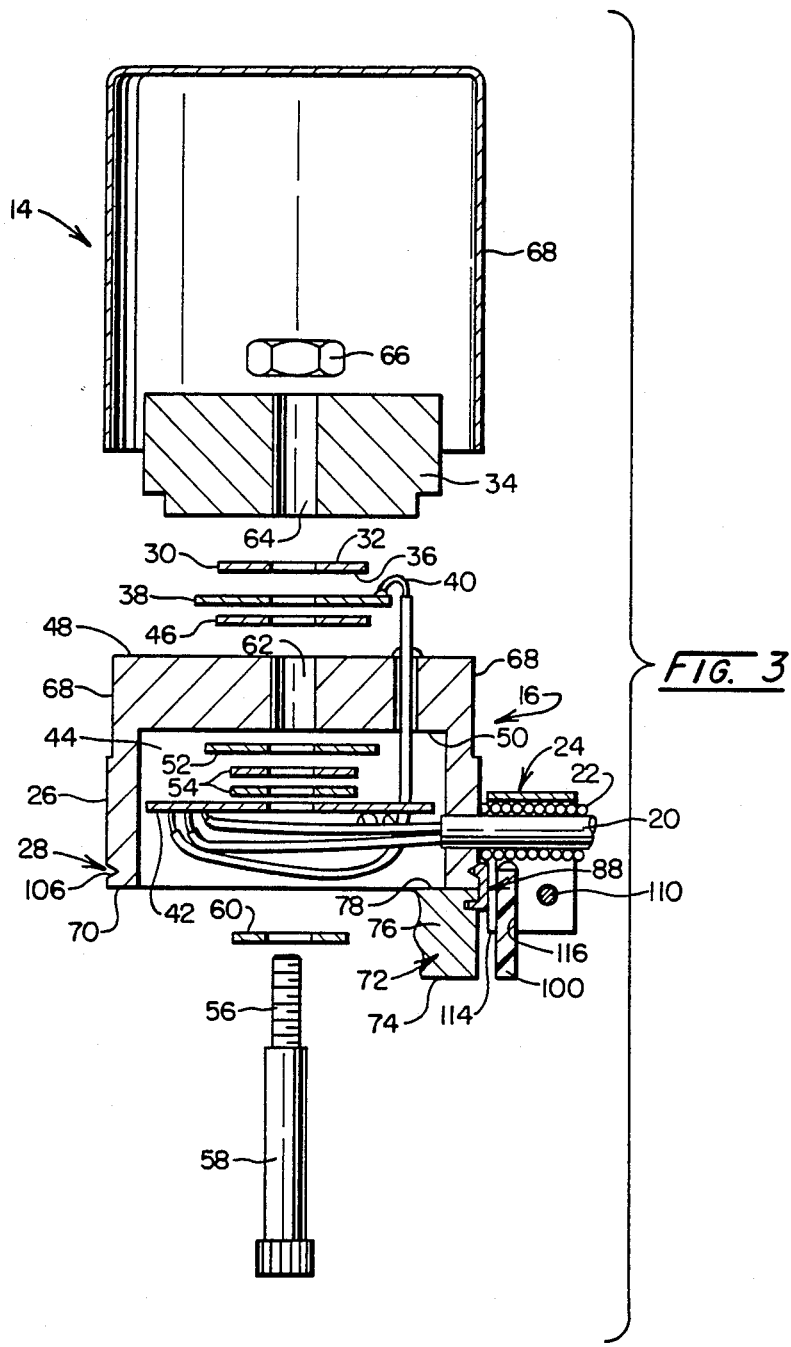
FIG. 3 is an exploded sectional view of the transducer component of the assemblage of the invention.

Referring to FIG. 1, a transducer assemblage according to the invention is revealed generally at 10 mounted upon a vibratory surface 12. Surface 12 may, for example, be a flat portion of a machine tool spindle or the like which calls for a demountable assemblage as at 10. The transducer of assemblage 10 is provided as an accelerometer or accelerometer sensor 14 having base 16 which is connected to surface 12 via an assemblage represented generally at 18. Signal communication between the accelerometer 14 and appropriate monitoring instrumentation is provided by communication cable 20 which is protected against chemical incursion by a Teflon coating and, additionally, for the rigorous machine tool environment, may be covered with a stainless steel armor jacket 22. The cable 20 and jacket 22 are stiffened as they join the base 16 of the transducer 14 by a stainless steel clamp represented generally at 24.

Looking additionally to FIG. 2, the assemblage 10 is shown in expanded format. In the figure, the accelerometer 14 is seen to include components which preferably are fabricated of stainless steel and which included noted base 16 which is configured having a cylindrical transducer wall 26, in turn, incorporating a biasing connector component provided as a V-shaped groove 28.

Turning momentarily to FIG. 3, the transducer assembly 14 is represented at an enhanced level of detail. Typically, such accelerometers are fabricated such that their lower disposed bases are configured to carry one polarity of the electric signal generated by them. However, for the instant application, it is necessary that the base 16 be electrically isolated from the sensing components of the device. The transducer functions in conjunction with a piezoelectric crystal 30 which is connected to have one electrode or charge generating surface as at 32 in electrical contact and in force transfer relationship with a known mass as represented by the stainless steel mass component 34. Thus, where vibration is induced from base 16 to the mass 34, resultant vibratory force effects at mass 34 are impressed upon the crystal 32 which will generate charge in correspondence therewith. This charge is used to develop a signal relating mass and force of the traditional relationship between force and mass-acceleration (F=ma). The opposite side or face 36 of crystal 30 is arranged for contact with a metal electrode 38 which functions to pick-up opposite polarity charges and convey them via insulative lead 40 to a circuit board assemblage 42 located within a cavity 44 formed within base 16. A mica washer 46 insulates the electrode 40 from the top surface 48 of base 16. Circuit board 42 also is insulated from the underside 50 of base 16 by a mica washer 52 and is spaced from the latter insulator by two flat washers 54. This entire assemblage is retained together by a machine screw 56 carrying a Kymar or shrink plastic insulator 58 which extends through flat washer 60, a bore 62 in base 16, corresponding openings in mica washer 46, electrode 38, and crystal 30 as well as a bore 64 in mass 34 to be secured by nut 66. All upper components of the assemblage are covered by a stainless steel cap 68 which is adhesively attached to the base 16 at recessed cylindrical portion 68. The circuit assemblage within cavity 44 preferably is "potted" with a silicon rubber leaving about a three 30 seconds relief area at the bottom region thereof. Base 16 is seen to be configured having a flat engaging surface 70 and somewhat closely adjacent thereto the noted V-shaped groove 28 serving as a biasing connector component.

Returning to FIG. 2, the assemblage 18 is seen to include a mounting base 72 having a lower disposed engaging surface 74 (see FIG. 4) which is configured for intimate abutting contact in vibration transfer relationship with the vibratory surface 12. The base 72 has a cylindrical periphery 76 of diameter correspondingly identical with the diameter of the cylindrical transducer base 16 and extends to an upwardly-disposed flat vibration transfer surface 78. A bore is provide centrally of mounting base 72 at 80 which extends part way through the base and which is counterbored (not shown) so as to accept the threaded shank of a bolt 82 which functions to mount base 72 to surface 12. In this regard, a tapped bore 84 is provided in the surface 12 to provide this fixed and essentially permanent mounting. In general, this mounting should be such as to assure a vibration transfer relationship between surface 12 and base 72, as well as to assure that no local resonances may develop which would adversely effect the flat frequency response of an accelerometer as at 14. While other attachment techniques for the base 72 are available, for example careful adhesive applications or welding, the noted employment of bolt and tapped bore 84 is preferred. The bore 80 is configured having a depth sufficient to enclose the otherwise protruding head of bolt 82 to avoid interference with the lower disposed components within cavity 44 of transducer base 16. Positioned within the upper region of the periphery 76 of mounting base 72 is a base biasing connector component provided as an annular groove 86 of rectangular cross-section.

Positionable over the upward portion of base 72 is a biasing ring provided as a resilient, stainless steel annular band 88 having an outwardly disposed surface 90 and being configured to have oppositely disposed, mutually spaced ends 92 and 94. With the latter arrangement, the band 88 can be constricted inwardly, the ends 92 and 94 approaching each other as this activity ensues. The inward surface of band 88 is configured having an integrally formed engaging component provided as a detent ring 96 formed in the upwardly disposed portion thereof and a similarly integrally formed lower internally disposed engaging component provided as a stud ring 98. In general, the stud ring 98 is configured having a rectangular cross-section corresponding with the rectangularly cross-sectioning groove 86 and is retained therein as a consequence of such cross-sectioning against vertical movement when the ring 88 is slid over the surface 76 of base 72 until engaging contact between stud ring and groove 86 is effected. Once that contact or engagement is accomplished, then the V-shaped groove 28 of base 26 of transducer 14 readily "snaps" into engagement with the detent ring 96 of the band 88. The entire assemblage of transducer base 26, ring 88, and mounting base 72 then is securely intercoupled by a constricting arrangement which, conveniently, may be provided as a hose clamp as represented at 100. Preferably, the clamp 100 is selected as a nylon device having oppositely disposed couplers 102 and 104, each with rearwardly slanted engaging teeth which intermesh as shown in FIG. 2 and may be drawn together, conveniently, with a pair of pliers or the like. In similar fashion, the clamp 100 may be removed from its constrictive coupling against the outer surface 90 of band 88 by simply urging one couplant 102 or 104 upwardly away from the other with a hand tool. The clamp 100 is available, for example, from Speedy Products, a division of Peacock Plastics, Inc., Jacksonville, Tex.

When the clamp 100 is released from constricting the annular band 88, the mounting and demounting of transducer 14 with its base 16 is quite simply carried out. Looking to FIG. 4, the cross-sectional structuring of band 88 is revealed as well as the cross-sectional configurations of annular groove 86 and mounting base 72 and the V-shaped groove 28 within transducer base 16. The rectangular stud ring 98 of annular band 88 is seen extending into correspondingly rectangularly configured groove 86 of base 72. Thus, the band 88, while slideably retained within groove 86 is restrained from any vertically oriented movement. V-shaped groove 28 of transducer base 16 is shown having a connector surface 106 which is canted outwardly and downwardly toward the engaging surface 70. Corresponding with this connector surface 106 is a lower disposed biasing surface of the detent ring 96 inwardly depending from annular band 88. With the arrangement thus shown, inasmuch as groove 28 is closely adjacent the lower engaging surface 70 of base 16, the latter base may be "snapped" into engagement with detent ring 96 without binding. In this regard, only a minimal flexure is required of the band 88 to accommodate for this angular movement as is represented by the tilting arrow shown in the figure. The mounting further is facilitated because of the gap in the band terminating in ends 92 and 94 (FIG. 2). Thus, mounting and demounting of the assemblage of the transducer 14-base 16 and the mounting base 72 is quite simple and readily carried out by maintenance personnel. When clamp 100 is tensioned or functions to constrict the band 88, however, the base 16 of accelerometer or transducer 14 is driven downwardly such that its engaging surface 70 is intimately and compressively biased against vibration transfer surface 78 of mounting base 72. Looking to FIG. 5, the operation of the compressive bias latter arrangement is revealed. It may be observed that biasing surface 108 is urged against the parallel, downwardly canted connector surface 106 when band 100 constricts against ring 88. this creates a downwardly directed vector of force urging engaging surface 70 into the noted compressive contact with transfer surface 78. The restriction against vertical movement by band 88 by virtue of stud ring 98 within groove 86 becomes apparent, ring 88 entering into a vertically oriented tensional stress. Removal of the constrictive clamp 100, of course, releases the corresponding constriction of band 88 and causes the assemblage to reassume the easily mountable-demountable condition represented in FIG. 4.

Returning to FIG. 2, the securement of communications cable 20 is shown in exploded fashion. Particularly where the assemblage 10 is to be utilized with components which, in themselves are in motion, such as spindles and the like, it is advantageous to secure such cable as at 20 against fatigue induced failure due to such movement. Additionally, the armored jacketing as at 22 protects the cable against the rigors of the environment of a machine tool including chips, lubricating and cooling oils, moving tool parts and the like. To assure a stiff connection at the union of the cable and transducer base 16, the clamp 24 extends rearwardly and over armored cable 22 and is retained in conventional fashion by bolt 110 and nut 112. Retaining the clamp 24 itself in secure and stiff orientation against the base 16 is rendered quite simple with the system due to the placement of an integrally formed flange, one side of which is seen at 114 in abutting adjacency against the wall 26 of transducer base 16. Note that flange 114 is curved to conform with the cylindrical configuration of base wall 26. Clamp 24 is very simply retained in an orientation against base 26 by virtue of a slot 116 formed rearwardly of the flanges as at 114 to permit passage of hose clamp 100 therewithin and thus retain the cable clamp 24 against base 16 as part of the overall mounting procedure. This positioning of the hose clamp 100 to carry out the dual function of constricting band 88 and retaining clamp 24 is additionally revealed in conjunction with FIGS. 1 and 3.

The procedure for mounting assembly 10 upon vibratory surface 12 involves intially assuring that the surface 12 is clean and flat. Bore 84 (FIG. 2) is drilled and tapped, with the axis of the bore being perpendicular to surface 12. Mounting base 72 is then fixed to surface 12 by installing the bolt 82 and torquing it to a specified value, for example, $4\frac{1}{2}$-$6\frac{3}{4}$ Newton meters. Assurance is made that the bolt 82 head does not extend above the vibration transfer surface 78. Ring or band 88 then is mounted upon the base 72 by manipulating the stud ring 98 over the side surfaces 76 until it resiliently snaps or moves into rectangular groove 86 which provides a mounting base and annular band assembly. Clamp 100 then is loosely positioned over latter assembly and the transducer or accelerometer 14 is mounted upon the mounting base and annular band assembly by manipulating the transducer base 16 within the band 88 until the detent ring 96 engages the annular groove 28 within base 16. As discussed in conjunction with FIG. 4, this is a simply carried out procedure with no particular effort on the part of the operator because annular band 88 is not constricted. Where the armored jacket 22 is employed, a determination of the length of flexible armor 22 required is made, for example, to a junction box or the like, and the end of the jacket 22 is urged over the cable 20 and clamp 24 is positioned over the terminus thereof at the surface 26 of base 16. Clamp 24 is urged downwardly such that the hose clamp 100 falls within slot 116. Bolt 110 and nut 112 are tightened to secure the end arrangement and, finally, pliers or the like are used to close the opposed and mating couplants 102 and 104 of hose clamp 100. This functions to constrict band 88 and cause the engagement of the biasing surface 108 with connector surface 106 to an extent deriving force vectors effecting a compressive abutting union between the engaging surface 70 and the vibration transfer surface 78 in an amount preventing the development of localized resonances which would adversely effect the frequency response of the assemblage 10.

Since certain changes may be made in the above-described apparatus and method without departing from the scope of the invention herein involved, it is intended that all matter contained in the description thereof or shown in the accompanying drawings shall be interpreted as illustrative and not in a limiting sense.

We claim:

1. A vibration transducer asembly for mountable and demountable attachment with a vibratory surface comprising:

a mounting base having a contact surface for intimate engagement with said vibratory surface, a base peripheral wall, a vibration transfer surface spaced from said contact surface, and a base biasing connector component integrally formed at said base peripheral wall;

means for securing said mounting base contact surface into said intimate engagement with said vibratory surface;

a transducer base having an engaging surface configure for intimate contact in vibration transfer relationship with said mounting base vibration transfer surface, a peripheral transducer wall extending from said engaging surface, and a transducer biasing connector component integrally formed at said peripheral transducer wall;

transducer sensing means supported by said transducer base and having a signal communications cable extending therefrom;

biasing ring means having an external surface and inwardly disposed first and second engaging components respectively engageable with said transducer biasing connector component and said base biasing connector component, and constrictable to effect movement of said transducer engaging surface into compressive engagement against said mounting base vibration transfer surface; and constricting means for effecting said constriction of said biasing ring means.

2. The transducer of claim 1 further comprising:

armor cladding extensible over said signal communications cable and having an end movable into abutting adjacency with said transducer base; and cable clamp means rigidly connectable with said armor cladding at the vicinity of said end and having an integrally formed flange of configuration for positioning in intimate adjacency with said external surface of said biasing ring means for retention thereagainst by said constricting means.

3. The transducer of claim 1 in which said constricting means is configured in the manner of a hose clamp.

4. The transducer of claim 1 in which:

said base peripheral wall is cylindrical, having a given diameter;

said peripheral transducer wall is cylindrical having said given diameter; and said biasing ring means is a resilient annular band having oppositely disposed non-contacting ends and having an internal cylindrical surface substantially of said given diameter when constricted by said constricting means.

5. The transducer of claim 4 in which:

said transducer biasing connector component is a groove formed within said transducer wall and having a connector surface canted outwardly and downwardly toward said engaging surface; and said biasing ring means first engaging component is an integrally formed inwardly protruding detent ring slideably conectable with said transducer biasing component connector surface for drivably urging said transducer base engaging surface into engagement with said vibration transfer surface.

6. The transducer of claim 5 in which:

said transducer biasing connector component connector surface is positioned closely adjacent said transducer base engaging surface so as to facilitate hand separation of said transducer base from said mounting base when said constricting means does not effect said constriction of said biasing ring means.

7. The transducer of claim 5 in which:

said base biasing connector component is a groove formed within said base peripheral wall; and said biasing ring means second engaging component is an integrally formed inwardly protruding stud ring slideably engageable with said base biasing connector component groove for securing said biasing ring means from movement toward said transducer base.

8. The transducer of claim 7 in which said groove and said stud ring are configured having complementing rectangular cross sections.

9. The transducer of claim 7 further comprising:

armor cladding extensible over said signal communications cable and having an end movable into abutting adjacency with said transducer base; and cable clamp means rigidly connectable with said armor cladding at the vicinity of said end and having an integrally formed flange of configuration for positioning in intimate adjacency with said external surface of said biasing ring means for retention thereagainst by said constricting means.

10. The transducer of claim 7 in which said constricting means is configured in the manner of a hose clamp.

11. An accelerometer assembly for use in evaluating the vibrational characteristics of a predetermined surface, comprising:

a mounting base having a contact surface for intimate engagement with said predetermined surface, an upstanding cylindrical side surface of given diameter, a vibration transfer surface spaced from said contact surface and an annular retainer groove formed in said side surface;

means for fixing said mounting base contact surface in vibration transfer relationship with said predetermined surface;

an accelerometer base having a lower disposed engaging surface configured for intimate abutting contact in vibration transfer relationship with said mounting base vibration transfer surface, a cylindrical periphery having said given diameter extending from said engaging surface, and an annular groove having a connector surface canted outwardly and downwardly toward said engaging surface;

accelerometer sensing means supported by said accelerometer base and having a signal communications cable extending therefrom, for response to vibrational phenomena asserted at said vibration transfer surface and derivation of corresponding signals;

a resilient, annular band having oppositely disposed, mutually spaced ends, an integrally formed inwardly extending stud ring insertable within and engageable with said mounting base retainer groove, and an integrally formed inwardly extending detent ring having a biasing surface abuttable against said accelerometer base connector surface when said engaging surface thereof is positioned in adjacency with said mounting base vibration transfer surface; and constricting means for effecting a constriction of said resilient annular band to urge said oppositely disposed ends toward each other and, simultaneously, cause said band to urge said transducer base engaging surface into biased contact with said vibration transfer surface.

12. The accelerometer assembly of claim 11 further comprising:

armor cladding extensible over said signal communications cable and having an end location movable into abutting adjacency with said accelerometer base periphery; and cable clamp means connectable with said armor cladding at said end location and having an integrally formed flange of configuration for positioning in abutting adjacency with the outwardly disposed surface of said annular band and securable thereagainst by said constricting means.

13. The accelerometer assembly of claim 11 in which said constricting means is configured in the manner of a hose clamp.

14. The accelerometer assembly of claim 11 in which said accelerometer base is electrically isolated from said accelerometer sensing means.

15. The accelerometer assembly of claim 11 in which said accelerometer base groove is configured having a V-shaped cross section and is positioned closely adjacent said accelerometer base engaging surface so as to facilitate hand separation of said accelerometer base from said mounting base when said constricting means is released from effecting said constriction of said resilient annular band.

16. The accelerometer assembly of claim 11 in which:

said accelerometer base annular groove is configured having a V-shaped cross section;

said mounting base annular retaining groove is configured having a rectangular cross section; and said resilient, annular band stud ring is configured having a rectangular cross section.

17. The method for removably attaching a vibration transducer to a vibratory surface comprising the steps of:

providing a mounting base having a contact surface, upstanding cylindrical side surfaces of given diameter, a vibration transfer surface spaced from said contact surface, and a retainer groove within said side surface;

fixing said contact surface to said vibratory surface in vibration transfer relationship;

providing a resilient annular band having oppositely disposed, mutually spaced ends, an integrally formed inwardly extending stud ring and an integrally formed inwardly extending detent ring having a downwardly disposed biasing surface;

mounting said annular band upon said mounting base by manipulating said stud ring over said side surface until said stud ring is engaged within said retainer groove to provide a mounting base and annular band assembly;

providing a transducer having a transducer base including a cylindrical periphery of said given diameter, a lower disposed engaging surface and an annular groove adjacent said engaging surface having a connector surface canted outwardly and downwardly toward said engaging surface;

mounting said transducer loosely upon said mounting base and annular band assembly by manipulating said transducer base within said band until said detent ring engages said annular groove; and constricting said resilient annular band to cause the engagement of said biasing surface with said connector surface and thence to an extent deriving force vectors effecting a compressive abutting union between said engaging surface and said vibration transfer surface in an amount preventing the development of localized resonances.

18. The method of claim 17 including:

providing a hose clamp for effecting said constricting step;

positioning said hose clamp about said annular band of said mounting base and annular band assembly prior to said step of mounting said transducer thereon; and carrying out said constricting step by tightening said hose clamp.

\* \* \* \* \*